G. W. Kidwell,
Plow Clevis
No. 107,692.  Patented Sep. 27, 1870.

Witnesses:
Gustave Dieterich
D. S. Mabee

Inventor:
G. W. Kidwell
per Munn & Co
Attorneys.

UNITED STATES PATENT OFFICE.

GEORGE W. KIDWELL, OF ELWOOD, INDIANA.

IMPROVEMENT IN ATTACHING DRAFT TO PLOWS.

Specification forming part of Letters Patent No. 107,692, dated September 27, 1870.

*To all whom it may concern:*

Be it known that I, GEORGE W. KIDWELL, of Elwood, in the county of Madison and State of Indiana, have invented a new and useful Improvement in Attaching Draft to Plows, &c.; and I do hereby declare that the following is a full, clear, and exact description thereof, which will enable others skilled in the art to make and use the same, reference being had to the accompanying drawing, forming part of this specification.

Figure 1:
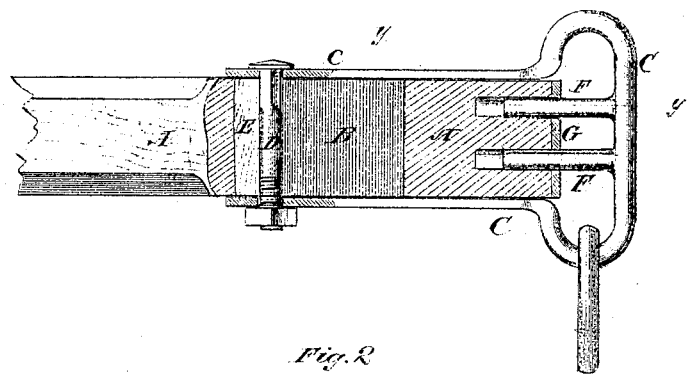
Figure 2:
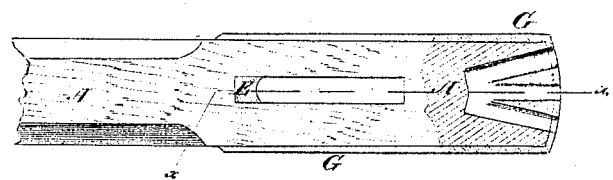
Figure 3:
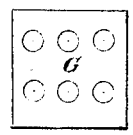

Figure 1 is a side view of a plow-beam to which my improvement has been attached, partly in section through the line $x\ x$, Fig. 2. Fig. 2 is a top view of the same, partly in section through the line $y\ y$, Fig. 1. Fig. 3 is a front-end view of the same, the clevis being removed.

Similar letters of reference indicate corresponding parts.

My invention has for its object to furnish an improvement in attaching draft to plows, harrows, reapers, mowers, and other machinery where the draft is attached by means of a clevis, which shall be so constructed that, should the plow or other machine strike a stone or other obstruction, the horses will be kept from being injured, and the machine from being broken by the sudden shock, and which will enable the line of draft to be adjusted to cause the plow to cut a wider or narrower furrow, as may be desired; and it consists in the construction and combination of the various parts, as hereinafter more fully described.

A represents the forward end of a plow-beam or other draft-bar, to which the draft is to be attached. The forward end of the draft-bar A is slotted, and in the said slot is placed a rubber or equivalent spring, B, which is kept in place by the arms of the clevis C, and against the rear end of which the clevis-bolt D rests in sustaining the draft, so that any jar will be received upon, and its force diminished by, the said spring B. In case the spring B should be too long or too strong, its force may be diminished by cutting off a part of said spring, and replacing the cut-away portion with a small block, E, of wood or other suitable material, fitted into the said slot, and placed either before or behind the clevis-bolt D, as may be desired or convenient.

The pins or projections F, that form the notches of the clevis that enable the point of draft-attachment to be raised and lowered, to cause the plow to work deeper or shallower in the ground, are made long, and enter holes in the forward end of the beam or bar A, and serve as guides and supports for the clevis.

Several sets of holes are formed in the forward end of the beam A for the reception of the pins or projections F, so that the forward end of the clevis or the point of draft-attachment may be adjusted in line with the said beam A, or at the one or the other side of the central line of the beam, as may be desired.

The slotted and perforated forward end of the beam A is strengthened by a metallic strap or plate, G, passed around the sides and forward end of the beam A, and the part of which that covers the forward end of the beam A is perforated to correspond with the perforations of said beam, hereinbefore described.

Having thus described my invention, I claim as new, and desire to secure by Letters Patent—

The slotted and end-perforated beam A, bolt D, and rubber B, combined with a clevis, C, having the inwardly-projecting pins F F, as and for the purpose specified.

GEORGE W. KIDWELL.

Witnesses:
S. D. VAN PELT,
AMOS J. KING.